UNITED STATES PATENT OFFICE.

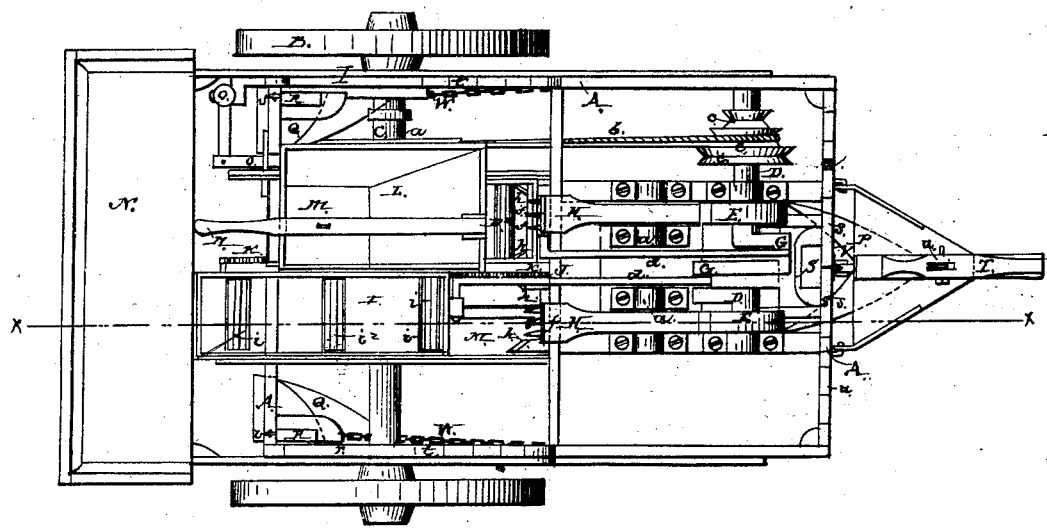

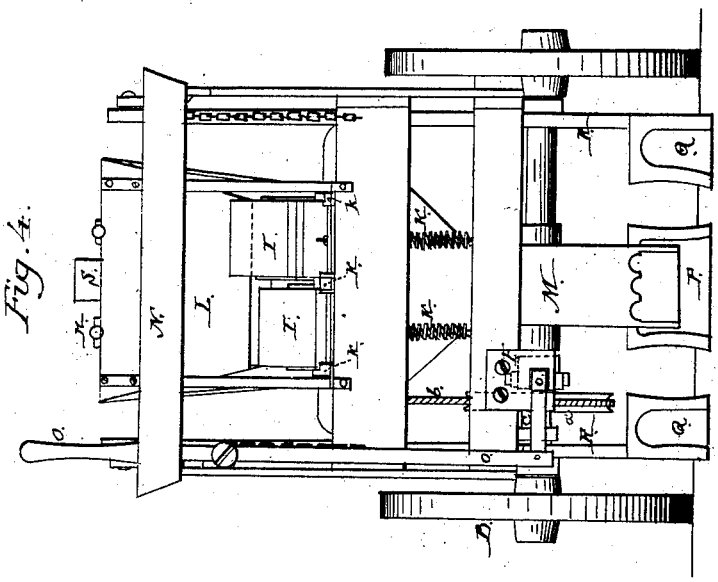
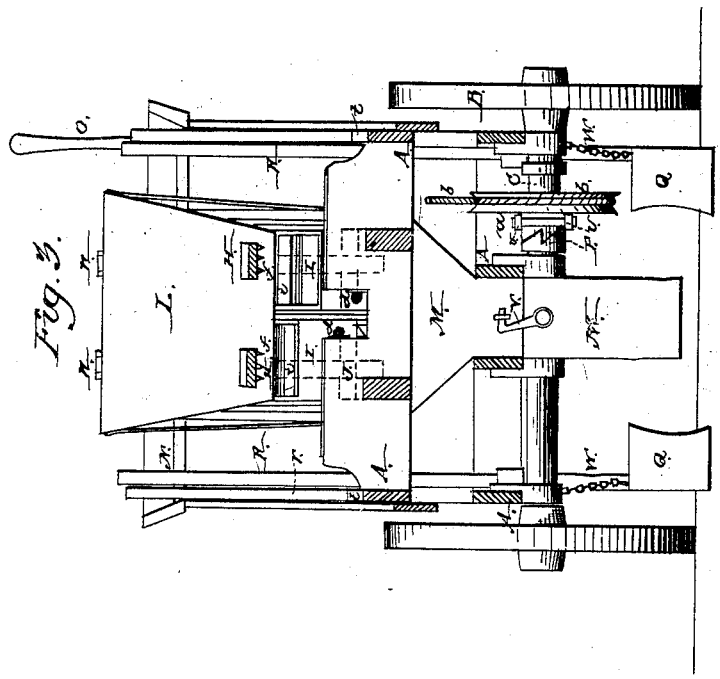

H. WAINRIGHT AND S. T. WILLIAMS, OF FARMINGDALE, NEW JERSEY.

IMPROVEMENT IN POTATO-PLANTERS.

Specification forming part of Letters Patent No. 19,054, dated January 5, 1858.

*To all whom it may concern:*

Be it known that we, HALSTED WAINRIGHT and SAMUEL T. WILLIAMS, of Farmingdale, in the county of Monmouth and State of New Jersey, have invented a new and Improved Machine for Planting Potatoes; and we do hereby declare that the following is a full and exact description thereof, reference being had to the accompanying drawings, making part of this specification—

Figure 1 being a plan of the machine; Fig. 2, a longitudinal vertical section thereof in the plane indicated by the line *x x*, Fig. 1; Fig. 3, a transverse vertical section in the plane indicated by the line *y y*, Fig. 2; Fig. 4, a rear elevation of the same.

Like letters designate corresponding parts in all the figures.

The machine being mounted in a suitable frame, A, supported by two wheels on separate axles, one of said wheels, B, has upon its axle C a pulley, *a*, from which a band or cord, *b*, passes forward and upward around one of a set of pulleys, *c c c*, on a shaft, D. The pulleys *c c c* are of different sizes, whereby the velocity of the shaft D may be varied, and consequently the distance between the hills be varied, as hereinafter to be set forth.

The shaft D is provided with two cranks, G G, on opposite sides thereof, so that they will alternate in their actions. Connectings-rods *d d* extend respectively from these cranks backward to oblong shallow troughs or boxes I I, to which they are respectively jointed. A reciprocating motion is thus communicated to these troughs under the compartments of a hopper, L, beneath which they are situated. The forward ends of the troughs incline downward, as seen in Fig. 2, so that the potatoes, as they are supplied thereto from the hopper, will roll or move forward to the front end thereof, this movement of the potatoes being assisted by the shaking produced by the reciprocating motion of the troughs; and in order to perfectly insure the proper agitation and supply of the potatoes in the front ends of the troughs we locate winged rollers *i i i* at intervals in the bottom of each trough and give them a constant revolving motion by means of pinions *l l l* on their axes, gearing into racks K K, as seen in Fig. 2, whereby the reciprocating movement of the troughs keeps the winged rollers turning.

In order to keep the pinions *l l l* surely in gear with the racks, springs *k k* may be respectively secured to the bottom of each trough and so attached to the frame A as to draw down upon the troughs. The front end of each trough should be kept constantly nearly full of potatoes, and for that purpose each compartment of the hopper L is provided with a removable bottom or gate, *m*, which is connected with a lever, *n*, on the top of the hopper. As the driver sits on the seat N, behind the hopper, he lifts the lever *n* when necessary, and thereby allows a sufficient quantity of potatoes to descend from the hopper into each trough I. There are also wedge-like projections *h h* secured to the frame in such positions that as the troughs come forward they will enter apertures made for their reception in the ends of the troughs and push the potatoes from the sides of the troughs toward the centers, as indicated in Fig. 1.

Upon the shaft D are also two cams, E E, respectively situated in the central longitudinal planes of the troughs I I. Directly behind these cams are situated forks H H, which are hinged upon pivots *a a*, as represented in Figs. 1 and 2, so that a vertical vibratory motion may be given to them. The forward end of each fork-shank is situated so as to be reached by the faces *e e*, Fig. 2, of the adjacent cam, and thereby be depressed by the revolution thereof, as seen in Fig. 2. This depression of the forward end of the fork-shank raises the rear end thereof, from which project points *f f*. These points are so situated that when the fork is released by the cam they will descend into the forward end of the corresponding trough I when at the termination of its forward stroke, and thus enter one of the potatoes therein.

There are two faces, *e e*, on each cam E, situated opposite to each other on the shaft D, and so arranged that the fork will be released and will fall both at the termination of the forward and backward stroke of its trough I. The effect of this arrangement is to cause a fork to enter and seize a potato when it descends at one time, and at the next descent to cast off the potato thus seized and deposit it in the mouth of the drill-tube M. A bar, J, extending across the frame just in front of the drill-tube, receives and holds the fork as it descends, and by thus suddenly checking the motion of the fork enables it invariably to cast off the potato clinging to it. In order to cause the fork to descend with sufficient force if its weight is not sufficient therefor, a spring, $g$, Fig. 2, is applied to its under side to draw it down with the proper degree of force. The heels $jj$ of the cams are abrupt, as seen in Fig. 2, in order to cause the forks to descend suddenly. The cams and forks being thus arranged, the motion of the cams cannot be reversed without breaking the machine. In order to provide against any accident which might therefore arise by backing the machine, we secure the pulley $a$ upon a loose collar on the shaft C, said collar having a ratchet-coupling, $p$, Fig. 3, so that the collar will be held and will turn with the axle C when the machine moves forward, but will disengage itself and not turn with the axle when the machine is backed.

A vibratory lever, $o$, is connected with the pulley-collar, and from the rear end thereof a hand-lever, O, extends upward to a position where it can readily be reached by the driver, so that he may stop or start the working of the machine at pleasure.

The drill-tube M is formed in two parts, hinged together, as shown at V, Fig. 3, so that by unlatching a hasp the lower part may be turned backward and upward, so as to be out of the way when the machine is moving from place to place.

A single drill-tooth, P, is located centrally beneath the front end of the machine, for opening the drills previous to depositing the potatoes for seed, and the potatoes are covered by two side drill-teeth, Q Q, beneath the hind part of the machine, as represented. The shanks R R and S of these drill-teeth extend upward through suitable mortises in the frame, and are respectively provided with brace-arms $rr$ and $s\,s$, hinged to their upper ends, the lower ends of the braces resting in notches $tt$ and $uu$ in the top of the frame, as represented. By shifting these braces to different notches the depth to which the drill-teeth extend is varied as required, and they are firmly held in any of the positions thus given to them. Chains or cords $vvv$ are secured to the frame, and by hooking them to the respective shanks of the drill-teeth they prevent the drill-teeth being raised out of their positions. Other chains, $www$, may extend forward and upward from the drill-teeth or the lower ends of their shanks to the frame A or the pole T of the machine, to which they are secured by hooks. These chains serve as tension-braces to strengthen the shanks of the drill-teeth.

The pole or tongue T of the machine is hinged to the frame, and is adjustable to different angles to suit the height of the teams by means of a curved brace, U, pivoted to the frame and provided with a set of holes, $zz$, through one of which and through the pole a bolt passes to secure the pole in the position required.

We do not claim the employment of a fork for drawing potatoes from a hopper in planting, being aware that such has before been used; but

What we claim as our invention, and desire to secure by Letters Patent, is—

1. The combination of a tripping-fork, H, with a reciprocating trough, I, so that the fork will by a uniform movement alternately take a potato from the trough and deposit it in the drill-tube, substantially as herein specified.

2. The arrangement of the inclined reciprocating troughs I I with revolving winged rollers $iii$, operating as described, in combination with the hopper L, provided with removable bottoms $mm$, whereby the potatoes are supplied as fast as required to the troughs, substantially as described.

3. The wedge-like projections $hh$, in combination with the reciprocating troughs, in the manner and for the purpose herein set forth.

HALSTED WAINRIGHT.
SAMUEL T. WILLIAMS.

Witnesses:
SAMUEL MORRIS,
JOHN B. WILLIAMS.